United States Patent [19]
Tokano

[11] Patent Number: 5,887,086
[45] Date of Patent: Mar. 23, 1999

[54] IMAGE PICK-UP APPARATUS

[75] Inventor: Kaneyoshi Tokano, Tokyo, Japan

[73] Assignee: Canon Kabushiki Kaisha, Tokyo, Japan

[21] Appl. No.: 419,985

[22] Filed: Apr. 11, 1995

[30] Foreign Application Priority Data

Apr. 15, 1994 [JP] Japan .................................. 6-101485

[51] Int. Cl.⁶ .................................................. G06K 9/20
[52] U.S. Cl. ........................................................ 382/312
[58] Field of Search .................................. 382/177, 178, 382/179, 182, 186, 187, 188, 189, 298, 301, 313, 321

[56] References Cited

U.S. PATENT DOCUMENTS

| | | | |
|---|---|---|---|
| 4,136,332 | 1/1979 | Kadota et al. | 382/177 |
| 4,408,342 | 10/1983 | Grabowski et al. | 382/177 |
| 4,804,949 | 2/1989 | Faulkerson | 382/313 |
| 4,850,025 | 7/1989 | Abe | 382/177 |
| 4,887,227 | 12/1989 | Tsujioka et al. | 382/177 |
| 4,901,364 | 2/1990 | Faulkerson et al. | 382/313 |
| 4,953,225 | 8/1990 | Togawa et al. | 382/313 |
| 5,025,484 | 6/1991 | Yamanari et al. | 382/61 |
| 5,038,391 | 8/1991 | Yamaguchi | 382/313 |
| 5,093,873 | 3/1992 | Takahashi | 382/177 |
| 5,157,736 | 10/1992 | Boyer et al. | 382/181 |
| 5,179,649 | 1/1993 | Masuzaki et al. | 382/177 |
| 5,197,107 | 3/1993 | Katsuyama et al. | 382/177 |
| 5,335,294 | 8/1994 | Niki | 382/177 |
| 5,452,380 | 9/1995 | Uehara et al. | 382/298 |
| 5,509,092 | 4/1996 | Hirayama et al. | 382/177 |
| 5,513,278 | 4/1996 | Hashiizume et al. | 382/301 |

FOREIGN PATENT DOCUMENTS

| | | |
|---|---|---|
| 0144202 | 6/1985 | European Pat. Off. . |
| 59-66275 | 4/1984 | Japan . |
| 59-75372 | 4/1984 | Japan . |
| 4-127780 | 4/1992 | Japan . |

*Primary Examiner*—Jose L. Couso
*Attorney, Agent, or Firm*—Fitzpatrick, Cella, Harper & Scinto

[57] ABSTRACT

An image pick-up apparatus having character recognition capability includes a movable indicator displayed on a view-finder screen so that the image of a character formed on the view-finder can be compared with the indicator, and, as a result, an operator can know whether or not a character will be recognized between the movable indicator and the character based on the comparison.

27 Claims, 6 Drawing Sheets

FIG. 3
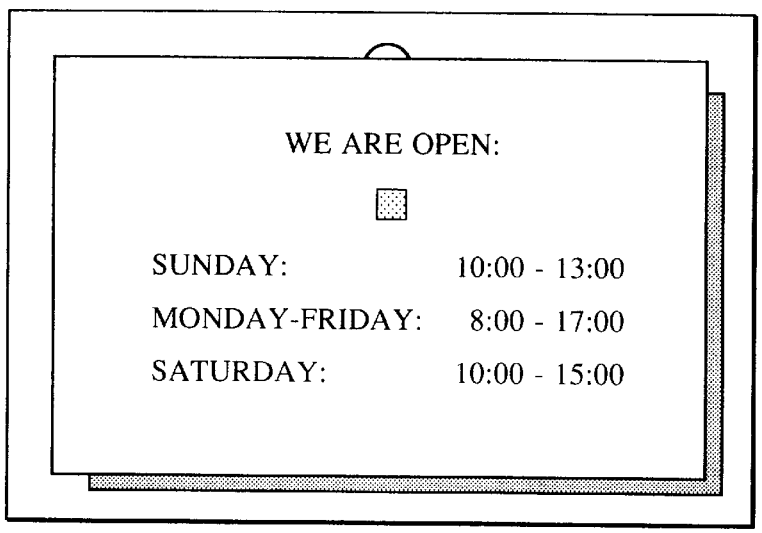 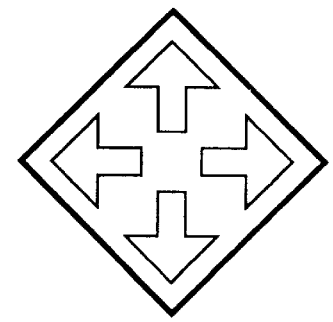
FIG. 4
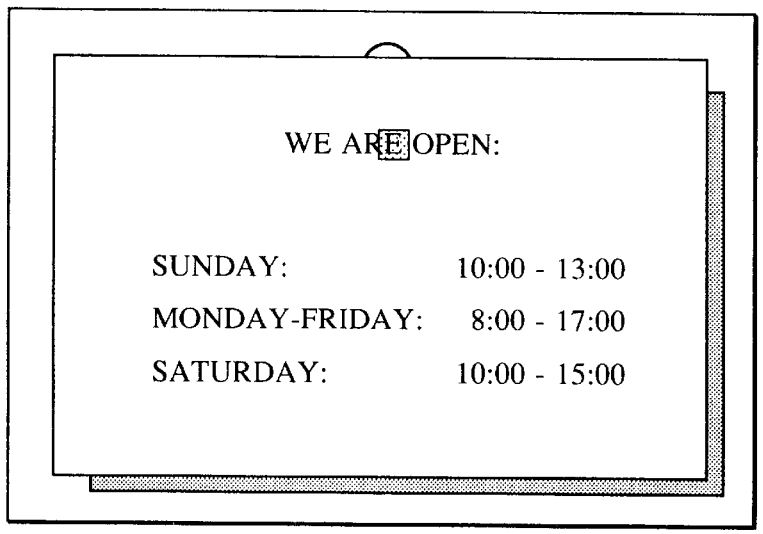 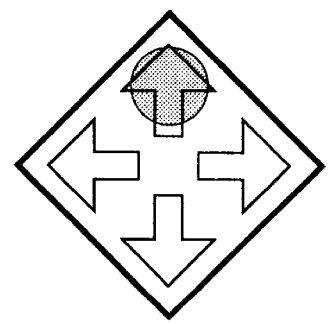

FIG. 5
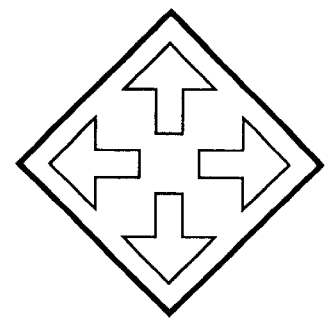
FIG. 6
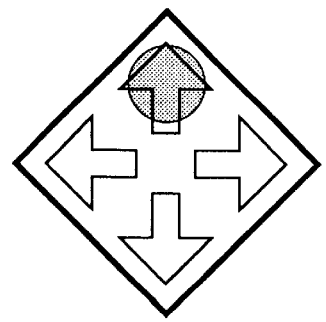

WE ARE OPEN:

SUNDAY: 10:00 - 13:00
MONDAY-FRIDAY: 8:00 - 17:00
SATURDAY: 10:00 - 15:00

IMAGE PICK-UP APPARATUS

BACKGROUND OF THE INVENTION

1. Field of the Invention

The present invention relates to an image pick-up apparatus, and more particularly to an image pick-up apparatus having the capability of character recognition.

2. Description of the Related Art

There are various types of apparatuses having the capability of character recognition in which images of printed or handwritten characters are read first and then recognized as characters thereby converting them into machine-recognizable codes, wherein the resultant data may be processed further as required for specific purposes. One example of such an apparatus is a business card reader that reads characters representing a company name and personal name printed on a business card, converts the read characters into machine-recognizable codes, and transmits the resultant text data to an electronic tool such as a palmtop computer, an electronic address book, etc. Another example is a language translator. In this example, the translator reads foreign language sentences printed on paper via a scanner and performs character recognition on them thereby obtaining a series of character codes. The language translator then translates the foreign language sentences into Japanese sentences and prints or displays the result on paper or a monitor screen. There are also electronic systems capable of recognizing handwritten characters. For example, some systems read handwritten characters such as numeric characters filled in fields in a predetermined format such as a questionnaire, and recognizes them, wherein the resultant data may be subjected to further processing such as summing, retrieving, or statistical analysis. These apparatuses or systems treat printed or handwritten characters not as images but as characters (in the form of coded character data), which makes it possible to perform various processing that will be impossible if the image data is directly processed. That is, image data associated with characters is read via an image sensor and converted into text data by means of character recognition. This makes it possible to perform further complicated processing such as data compression, data retrieval, language translation, etc.

On the other hand, there are image pick-up apparatuses (video cameras) for recording and reproducing the image of a natural scene or subject, wherein the image is recorded in the form of image data. The image data output by this image pick-up apparatus can be input to a character recognition apparatus that converts the image data into text data and performs further processing such as that described above. The image pick-up apparatuses of this type are assumed to be used to take a picture of a natural scene or subject in a manner similar to that of conventional photographic cameras. Therefore, unlike scanners used on a desktop, they are designed to have basic capabilities and functions of a small size and light weight camera. When taking a picture of an object that cannot be moved, it is possible to take its picture by moving the image pick-up apparatus itself. It is also possible to perform adjustment regarding the size of a subject by adjusting the magnification by means of zooming or adjusting the distance to the subject. There is also provided an auxiliary illumination lamp that makes it possible to take a picture in the dark.

With the image pick-up apparatus of this type, it is possible to easily input image data of characters at a fixed location or characters having a size which could not be dealt with by other techniques. Thus, use of character recognition is expanded to a variety of applications.

In the technique described above, characters to be input are read first via an image pick-up apparatus or an image sensing unit, and the obtained image data is subjected to character recognition processing. The size of characters that can be recognized is limited by the resolution of the image sensing unit. This means that characters having a size less than a threshold cannot be recognized even if they look very clear.

In the case where an apparatus has an image sensing unit with no capability of adjusting the magnification, an operator can know the allowable lower limit of character sizes by referring to the description in an operation manual. In an apparatus having the capability of adjusting the magnification, in the case the characters are too small, a message indicating that the characters are too small to recognize is given at a stage of character recognition processing.

However, at a stage of acquiring a character image, an operator cannot know whether or not the character size is large enough for character recognition. If the size of the acquired character image is less than the allowable lower limit, the operator becomes aware of that fact when the image data is subjected to character recognition. Thus, there are disadvantages: (1) the operation becomes useless; and (2) it takes a long time to become aware of the failure.

There will be a further discussion below about a specific system in which image data of characters is acquired via an image sensing unit and then transferred to a separate character recognition apparatus which recognizes the characters thereby converting them into text data.

In the first step, characters to be recognized are captured by an image pick-up apparatus such that the images of the characters are focused on the screen of the view finder. At this stage, it is impossible to judge whether the characters to be recognized have a size large enough to be recognized. In this apparatus, it would be meaningless that an operation manual had a description about the allowable lower limit of character sizes because the ratio of the size of actual characters to that of character images can be changed by a zooming operation or by changing the distance to the subject. As a result, an operator has to input image data without any reference about the size. The character images acquired via the image sensing unit of the image pick-up apparatus are converted to image data by a signal processing unit and then transferred to the character recognition apparatus via input/output ports. Or otherwise, the converted image data is stored temporarily on a recording medium, and the recording medium is inserted into the character recognition apparatus thereby transferring the data. The character recognition apparatus attempts to recognize the input character image data. At this stage, it is judged whether the given characters have a proper size. If it is concluded that the size of the character is too small to be recognized, the apparatus issues a message to notify the operator of that fact. In response to the message, the operator should take required action. However, in any case, the operation and the time spent for that operation become useless, and thus every thing has to be done from the beginning. When an image containing information of a transitory phenomenon is dealt with, there may be no further chance, in the worst case, of acquiring an image of the same phenomenon.

SUMMARY OF THE INVENTION

It is an object of the present invention to provide an electronic apparatus having the capability of indicating an allowable character size so that an operator can judge, at an inputting stage, whether a character has a size large enough to be recognized.

It is an another object of the present invention to provide a character recognition system with an image sensing unit, that is capable of recognizing characters according to a simple operation procedure.

It is a further object of the present invention to provide an image pick-up apparatus having the capability of indicating an allowable character size so that an operator can judge, at a stage of acquiring an image, whether a character has a size large enough to be recognized.

It is still another object of the present invention to provide a high-performance video camera that can be used easily.

The above objects are achieved by the present invention having various aspects and features as described below.

According to a first aspect, an electronic apparatus includes: display means for displaying input character information; and control means for controlling an indicator displayed on the display means in such a manner that the size of the indicator represents an allowable character size wherein if the character information has such a character size then the character information can be recognized as a character or characters. By virtue of the foregoing arrangement, an operator can judge, at an inputting stage, whether a character to be input has a size large enough to be recognized. Because the judgement of whether the input character information can be recognized as a character can be performed before the character recognition processing, there is no chance that useless processing is performed thereby wasting time.

According to another aspect of the present invention, there is provided a character recognition system which includes: display means for displaying input character information; character recognition means for recognizing the character information as a character or characters; and control means for performing control such that an indicator is displayed on the display means in such a manner that the size of the indicator represents a character size that will be allowed in character recognition processing performed by the character recognition means. With the above-described character recognition system, it is possible to perform character recognition according to simple operations. Furthermore, there is no chance that useless processing is performed thereby wasting time.

According to a further aspect of the present invention, an image pick-up apparatus includes: image sensing means for sensing the image of a subject; display means for displaying the image of the subject sensed by said image sensing means; indicator displaying means for displaying an indicator on the display means, the indicator representing an allowable character size wherein if character information included in the image of the subject sensed by said image sensing means has the allowable character size then said character information can be recognized as a character or characters. With the image pick-up apparatus having the above-descried arrangement, an operator can judge, at a stage of acquiring an image, whether a character to be acquired has a size large enough to be recognized. The judgement of whether the character has a size large enough to be recognized as a character can be performed before the character recognition processing, and thus the operator can acquire an image without missing even a rare chance. Furthermore, as a result, it becomes possible to reduce the probability that useless processing is performed thereby wasting time.

According to another aspect of the present invention, a video camera includes: image sensing means for sensing the image of a subject; character recognition means for recognizing, as a character or characters, the character information included in the subject image sensed by the image sensing means; and mode selection means for switching the operation mode between a character recognition mode in which said character recognition means performs character recognition and a normal mode in which the character recognition means does not perform character recognition. The above described video camera arranged to have the capability of character recognition can be used very easily in various useful applications.

These and other features and advantages of the present invention will be more readily apparent from the following detailed description when read in connection with the accompanying drawings.

BRIEF DESCRIPTION OF THE DRAWINGS

FIG. 3 illustrates a view-finder of an image pick-up apparatus, wherein the image of a subject is displayed on the view-finder screen;

FIG. 4 illustrates an indicator that has been moved on the view-finder screen by an indicator position shifter;

FIG. 5 illustrates the view-finder screen on which the image of the subject is displayed with a magnification different from that in FIGS. 3 and 4;

FIG. 6 illustrates the indicator that has been moved, by the indicator position shifter, on the view-finder screen from the position shown in FIG. 5 to a different position wherein the image of the subject is displayed with the magnification different from that in FIGS. 3 and 4;

DESCRIPTION OF THE PREFERRED EMBODIMENTS

Figure 1:
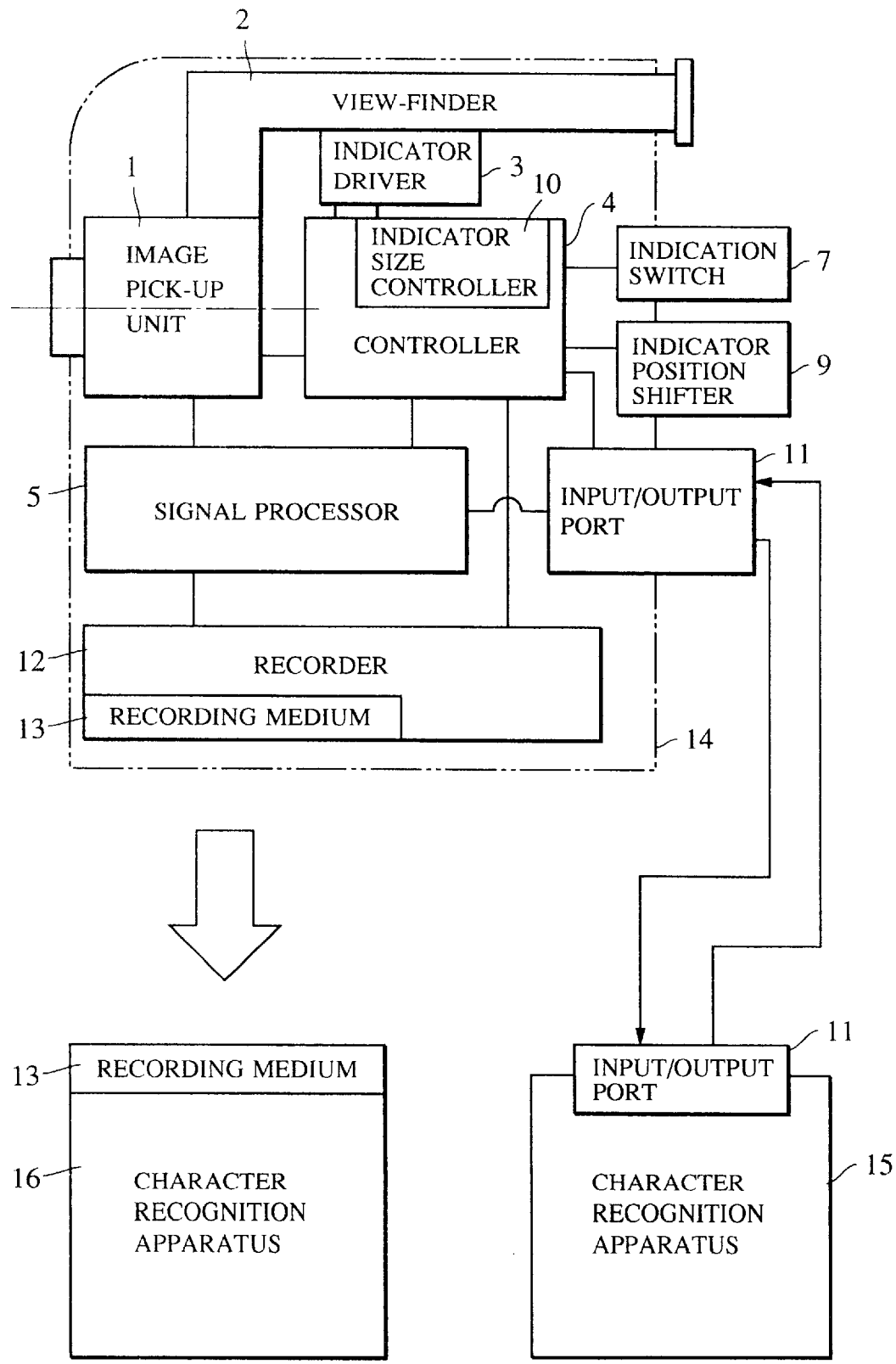
FIG. 1 is a block diagram of a first embodiment of an image pick-up apparatus that can be connected to a character recognition apparatus.
Figure 2:
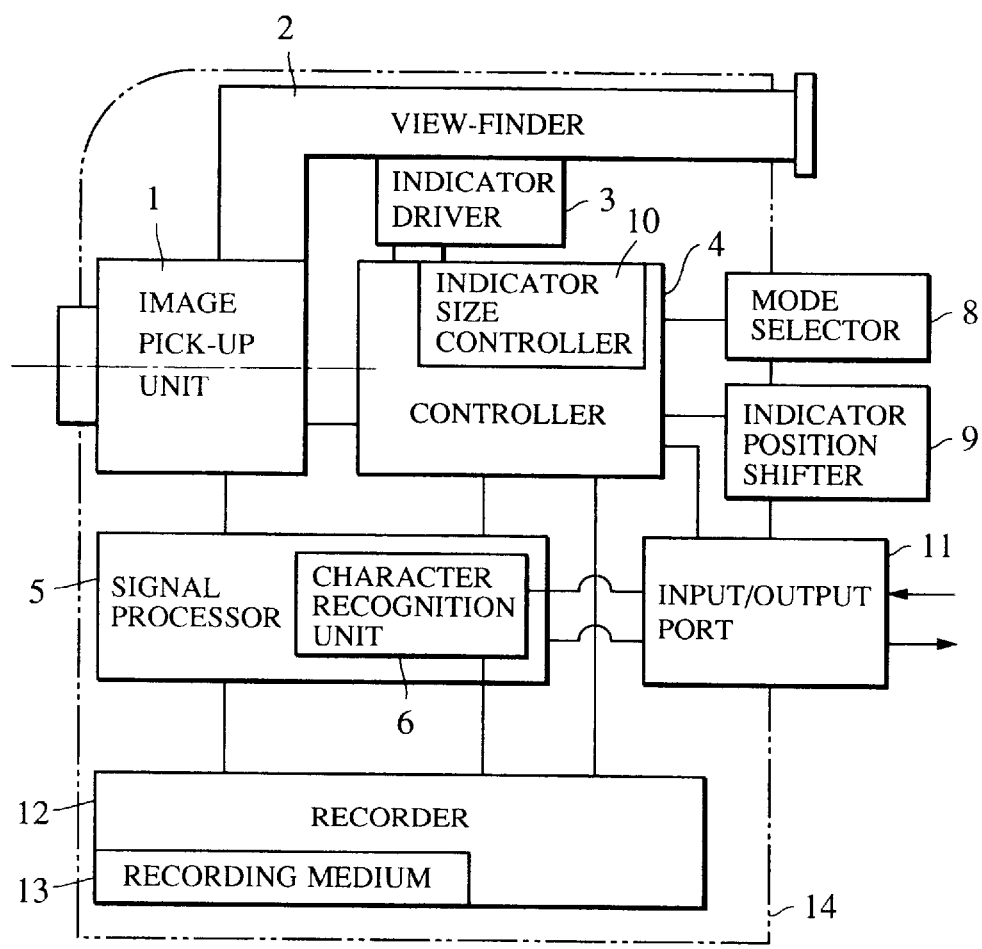
FIG. 2 is a block diagram of a second embodiment of an image pick-up apparatus having a built-in character recognition unit.

FIGS. 1 and 2 are a block diagram illustrating two embodiments of the present invention, wherein the apparatus shown in FIG. 1 does not have a character recognition unit inside its main unit, and the apparatus shown in FIG. 2 has a built-in character recognition unit.

In FIGS. 1 and 2, there are shown: an image pick-up unit 1 for sensing an image of a subject such as a character or a scene; a view-finder 2 for showing the image of the subject to be acquired; an indicator driver 3 for displaying an indicator representing the lower limit of character sizes that can be recognized satisfactorily; a controller 4 for controlling the operation of the apparatus; a signal processor 5 for converting the acquired image to image data; a character recognition unit 6 for recognizing the image data thereby converting the image data to text data; an indication switch 7 for switching the indication state between a state in which the indicator is displayed and the other state in which the indicator is not displayed; a mode selector 8 for selecting either a character recognition mode or a picture taking mode; an indicator position shifter 9 for shifting the indicator within the view-finder; an indicator size controller 10 for changing the size of the indicator during an electronic zooming operation; an input/output port 11 via which image data is transferred to an external character recognition apparatus; a recorder 12 for recording the image data; a recording medium 13 for recording the image data so that the recorded data is transferred to an external character recognition apparatus via the recording medium; a main unit 14 of the apparatus; an external character recognition apparatus 15 provided with an input/output port via which the image data is input; and an external character recognition apparatus 16 adapted to accept the same recording medium used in the main unit 14 of the apparatus.

In the image pick-up apparatus shown in FIG. 1, the image of a character acquired via image pick-up unit 1 is converted to image data by signal processor 5 in the image pick-up apparatus, and transferred to character recognition apparatus 15 or 16 via input/output port 11 or recording medium 13. Character recognition apparatus 15 or 16 recognizes the received image data thereby converting it to text data.

In the image pick-up apparatus shown in FIG. 2, the image of a character acquired via image pick-up unit 1 is converted to image data by signal processor 5 as in the apparatus of FIG. 1, and transferred to character recognition unit 6. Character recognition unit 6 recognizes the received image data thereby converting it to text data. The resultant text data is output via input/output port 11 for further processing.

The operation of the apparatus according the present embodiment is described below in detail in which the discussion focuses on view-finder 2.

By way of example, FIG. 3 illustrates a screen of view-finder 2 on which there is displayed a signboard to be photographed wherein the signboard tells when a shop is open. In this example, the signboard telling the shop hours occupies the entire area of the view-finder screen. In the middle of the screen of the view-finder, there is shown an indicator in the form of a square that is displayed on the screen by indicator driver 3 shown in FIGS. 1 and 2 such that the indicator represents the lower limit of the character sizes that can be recognized by the character recognition unit 6 or the character recognition apparatus 15 or 16. By comparing a character displayed on the screen with the size of the indicator, an operator can know whether the character has a size large enough to be recognized. More specifically, if the size of a character is less than size of the indicator, then the information regarding the character is insufficient to recognize it. Conversely, if the size of the character is greater than the size of the indicator, the character can be recognized satisfactorily. However, in the state shown in FIG. 3, it is difficult to compare the size of characters to the size of the indicator, since the indicator is displayed at a location apart from the characters.

This problem is solved by using the indicator position shifter 9 (refer to FIGS. 1 and 2) according to the invention. This capability facilitates the comparison of the character size as described below. Indicator position shifter 9 can be realized by using for example arrow keys, a joystick, a mouse, a trackball, etc. Indicator position shifter 9 can also be realized by using touch-sensitive switches, or viewed-point detection means that detects whether the indicator itself or an arrow mark displayed on the view-finder screen is viewed by an eye of an operator whereby the indicator is shifted according to the detection result. Indicator position shifter 9 using the touch-sensitive switches is described in more detail below. Four touch-sensitive switches labelled with arrows are disposed at the right side of the view-finder screen. These touch-sensitive switches act as indicator position shifter 9 in such a manner that if one of these touch-sensitive switches is touched, the indicator moves on the view-finder screen in the direction pointed to by the arrow of the touched switch. In the example shown in FIG. 4, the up-arrow key of the indicator position shifter is operated so as to move the indicator upward on the view-finder screen until the indicator overlaps a character "E". In this example, the entire portion of the character "E" is inside the indicator. Thus, an operator can know at this stage that if the image of the character is acquired by the apparatus, then the information regarding the character will be insufficient to perform satisfactory character recognition. If character recognition is required, the operator can acquire the character images after enlarging the character size to a level greater than the indicator size by adjusting the distance to the subject or performing a zooming operation.

FIG. 5 illustrates the view-finder screen on which is displayed the image of the subject to be acquired that is now viewed from a closer position. The frame of the signboard that was inside the view-finder screen in the previous example is now outside the screen and can no longer be seen. The character size is now greater than that in FIG. 3. Referring to FIG. 6, the indicator has been moved to the position of the character "E" by operating the indicator position shifter as in the case of FIG. 4. Unlike FIG. 4, the entire portion of the character "E" is not inside the indicator, and a part of the character "E" is outside the indicator. Thus the operator can know that if the image of the character is acquired under this condition, the character has a size large enough to provide sufficient information required for later character recognition processing.

However, if the character size is enlarged by performing an electronic zooming operation in which the reading area of an image sensing device is varied, the information available by the character remains unchanged although the apparent character size is enlarged. In this case, the enlarged character size does not make it possible to recognize the character.

Figure 7:
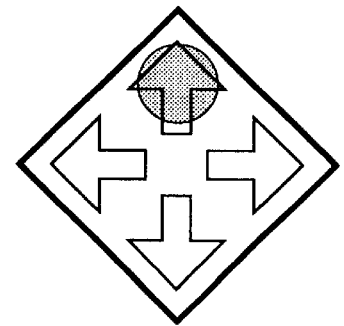
FIG. 7 illustrates the view-finder screen wherein the image of the subject displayed on the view-finder screen is enlarged by means of electronic zooming.

FIG. 7 illustrates an example in which the character size is enlarged by means of electronic zooming to a degree similar to that in FIG. 5. In this case, however, unlike FIG. 5, not only the character size but also the indicator size is enlarged by a factor corresponding to the magnification of the electronic zooming. If the indicator is moved by operating the indicator position shifter to the position overlapping the character "E", it becomes clear that the entire portion of the character is inside the indicator. In the case where the information associated with a character remains unchanged when the character is enlarged, as in the above example, the indicator size controller 10 shown in FIGS. 1 and 2 changes the size of the indicator to a degree corresponding to the enlarged character size.

When the type of character (kanji and kana characters, numeric characters, alphabetic characters, etc.) to be acquired is specified and thus limited by using the character type selection capability of the apparatus, the indicator size is also changed by the indicator size controller. For example, if the character type is limited to a set of numeric characters, it is required to recognize only ten different characters including 0 to 9, and thus a smaller amount of information is enough to distinguish them from each other. This means that the lower limitation of the character sizes that can be recognized becomes smaller. Therefore, the indicator size is reduced in response to the reduction in the lower limit of the recognizable character sizes.

The image pick-up apparatus may also be used to acquire the image of a subject other than characters. For example, when a picture of an individual is taken, the indicator representing the lower limit of the recognizable character sizes does not play any roll. The indicator may overlap the subject and thus may disturb the operation of an operator. In this case, it is desirable that the indicator is not displayed. To achieve the above requirement, the apparatus has indication switch 7.

Figure 8:
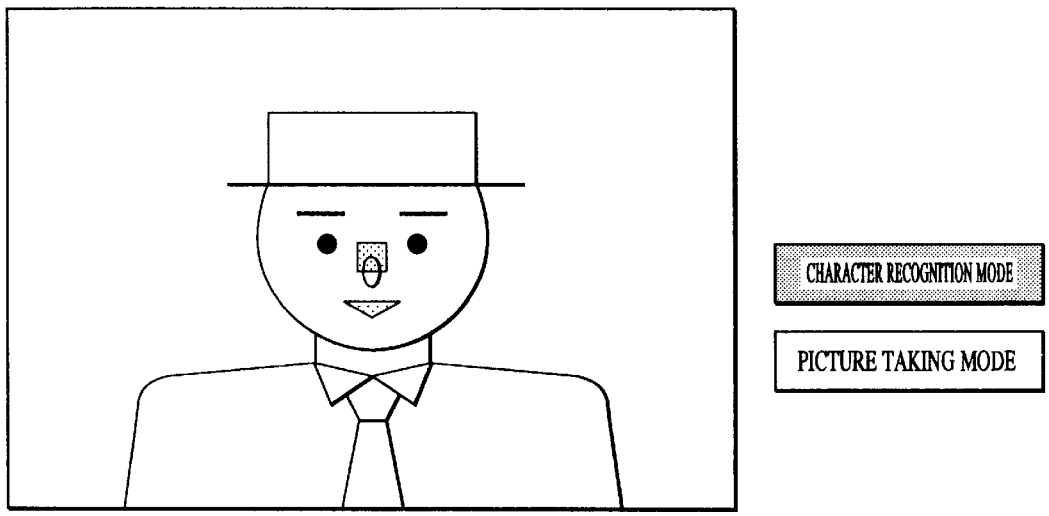
FIG. 8 illustrates the view-finder screen on which the image of another subject is displayed in a character recognition mode.
Figure 9:
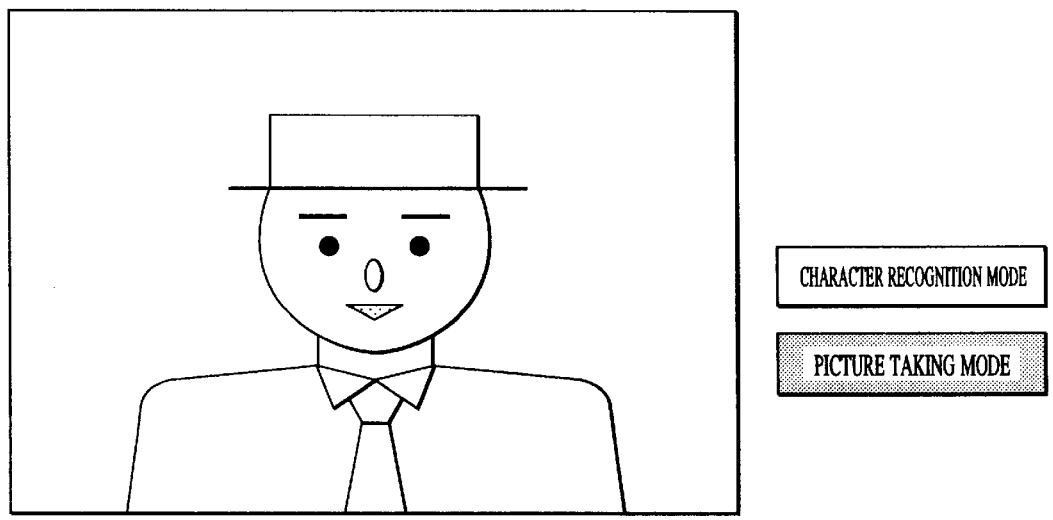
FIG. 9 illustrates the view-finder screen on which the image of the subject is displayed in a normal picture taking mode.

In the example shown in FIGS. 8 and 9, the switching operation by indication switch 7 between a display state and a non-display state is linked to the operation of the mode selector. In this example, the image pick-up apparatus has a built-in character recognition unit as shown in FIG. 2 so that the operation mode can be switched between the character recognition mode in which the acquired image is subjected to character recognition processing to a picture taking mode in which the acquired image is dealt with directly as the image data.

FIG. 8 illustrates the view-finder in which the character recognition mode is selected, and FIG. 9 illustrates the view-finder in which the picture taking mode is selected. In FIG. 8, the indicator is superimposed on the image of a human, and the indicator obstructs the clear observation of the human face. In contrast, in FIG. 9, the indicator is deleted in response to the switching to the picture taking mode, and thus the subject can be viewed clearly without any obstruction. In this mode, therefore, the image of a subject such as a natural scene to be photographed is displayed on the view-finder in a more suitable manner. In the above example, the indicator is switched on or off in response to the operation of mode selector 8. Alternatively, the indicator may also be controlled by an independent indication switch (not shown).

If it is concluded according to the above procedure that the image of a subject is formed in a proper fashion, then the image of the subjected is acquired. In the case where the apparatus shown in FIG. 1 is used, the image of characters is acquired and then subjected to character recognition according to the procedure described below.

The character image acquired by the image pick-up apparatus is converted to image data by the signal processor provided in the image pick-up apparatus. At this stage, it has become possible to treat the characters as image data. The image data is then transferred to the character recognition apparatus 15 or 16 via the input/output port 11 or via the recording medium 13. The character recognition apparatus 15 or 16 recognizes the image data thereby converting the image data to text data. Since the character image has a large enough size relative to the indicator displayed on the view-finder screen, the image data is guaranteed to have sufficient information required for character recognition. The resultant text data will be processed further as required.

Although the present invention has been described in detail with reference to specific embodiments, the description is illustrative of the invention and is not to be construed as limiting the invention. It is apparent that various modifications are possible.

Furthermore, in the above-described embodiments, the invention is applied to an image pick-up apparatus provided with a view-finder. However, the present invention can be applied to various optical apparatus other than the image pick-up apparatus, and also to various other types of apparatus.

In the present invention, as described above, the indicator is displayed on the view-finder screen of the image pick-up apparatus so that the size of character image can be easily compared with the indicator size that indicates the lower limit of character sizes that can be recognized. Thus, at a stage of acquiring a character image, a user can know whether the character image has sufficient information required for character recognition.

The indicator can be moved to a desired arbitrary position by operating the indicator position shifter. This makes it possible to easily compare the size of a character image located at any position on the view-finder screen with the reference size represented by the indicator.

The indicator can be turned on and off by operating the indication switch. If the image pick-up apparatus has a built-in character recognition unit, and furthermore the apparatus is adapted to switch the operation mode between the character recognition mode in which an acquired image is subjected to character recognition and the normal picture taking mode in which an acquired image is dealt with directly as image data, then the apparatus can be arranged such that the indicator is turned on or off in response to the switching of the mode selector, and thus the indicator can be removed during an operation for taking a picture of a subject such as a portrait so that the indicator does not obstruct the operation.

When electronic zooming is used, the size of the indicator is changed in response to the magnification of the electronic zooming so that an operator can know the essential character size that depends on the real amount of information in the character has, regardless of the apparent character size. In the apparatus having the capability of specifying the type of characters to be acquired, the size of the indicator is changed according to the specified character type so that the indicator can represent a proper reference size.

What is claimed is:

1. An image pick-up apparatus comprising:

image sensing means for sensing the image of a subject;

display means for displaying the image of the subject sensed by said image sensing means;

character recognition means for recognizing, as a character or characters, character information included in the image sensed by said image sensing means;

mode selection means for switching an operation mode between a first mode in which said character recognition means performs character recognition and a second mode in which said character recognition means does not perform character recognition; and indicator displaying means for turning on and off an indicator on said display means according to the mode selected by said mode selection means, a size of said displayed indicator indicating a minimum character size for character recognition processing performed by said character recognition means.

2. An image pick-up apparatus according to claim 1, further comprising:

indicator position shifting means for moving said indicator on the display means.

3. An image pick-up apparatus according to claim 1, further comprising:

indicator switching means for turning on and off said indicator on said display means.

4. An image pick-up apparatus according to claim 1, further comprising indicator size changing means for changing the size of said indicator.

5. An image pick-up apparatus according to claim 4, further comprising electronic zooming means for obtaining a zooming effect by electronically enlarging a part of the image signal obtained via said image sensing means, wherein in response to the zooming operation of said electronic zooming means said indicator size changing means changes the size of said indicator according to the zooming magnification.

6. An image pick-up apparatus according to claim 4, further comprising character type selection means for selecting the type of characters to be recognized by said character recognition means, wherein said indicator size changing means changes the size of said indicator according to the type of characters selected by said character type selection means.

7. An electronic apparatus comprising:

input means for inputting character information;

display means for displaying character information input by said input means;

character recognition means for recognizing, as a character or characters, the character information input by said input means;

mode selection means for switching an operation mode between a first mode in which said character recognition means performs character recognition and a second mode in which said character recognition means does not perform character recognition; and control means for performing control such that an indicator is displayed on said display means in such a manner that a size of the displayed indicator indicates a minimum character size for character recognition processing performed by said character recognition means in a state that the first mode is selected by said mode selection means.

8. An electronic apparatus according to claim 7, further comprising:

indicator position shifting means for moving said indicator on said display means.

9. An electronic apparatus according to claim 7, further comprising:

indicator switching means for turning on and off said indicator on the display means.

10. An electronic apparatus according to claim 7, further comprising:

indicator size changing means for changing the size of said indicator.

11. An electronic apparatus according to claim 10, further comprising:

character type selection means for selecting the type of characters to be recognized by said character recognition means;

wherein said indicator size changing means changes the size of said indicator according to the type of characters selected by said character type selection means.

12. A character recognition system comprising:

display means for displaying input character information;

character recognition means for recognizing said character information as a character or characters;

mode selection means for switching an operation mode between a first mode in which said character recognition means performs character recognition and a second mode in which said character recognition means does not perform character recognition; and control means for performing control such that an indicator is displayed on said display means in such a manner that a size of the displayed indicator indicates a minimum character size for character recognition processing performed by said character recognition means in a state that the first mode is selected by said mode selection means.

13. A character recognition system according to claim 12, further comprising:

indicator position shifting means for moving said indicator on said display means.

14. A character recognition system according to claim 12, further comprising:

indicator switching means for turning on and off said indicator on said display means.

15. A character recognition system according to claim 12, further comprising:

indicator size changing means for changing the size of said indicator.

16. A character recognition system according to claim 15, further comprising:

character type selection means for selecting the type of characters to be recognized by said character recognition means;

wherein said indicator size changing means changes the size of said indicator according to the type of characters selected by said character type selection means.

17. An image pick-up apparatus according to claim 1, further comprising:

mode selection means for switching an operation mode between a character recognition mode in which said character recognition means performs character recognition and a normal mode in which said character recognition means does not perform character recognition.

18. An image pick-up apparatus according to claim 17, wherein said image sensing means senses a still image.

19. A character recognition apparatus used with display means for displaying input character information comprising:

character recognition means for recognizing said character information as a character or characters;

mode selection means for switching an operation mode between a first mode in which said character recognition means performs character recognition and a second mode in which said character recognition means does not perform character recognition; and signal generating means for generating a signal to control such that an indicator is displayed on said display means in such a manner that a size of the displayed indicator indicates a minimum character size for character recognition processing performed by said character recognition means in a state that the first mode is selected by said mode selection means.

20. A character recognition system according to claim 19, further comprising:

indicator position shifting means for moving said indicator on said display means.

21. A character recognition system according to claim 19, further comprising:

indicator switching means for turning on and off said indicator on said display means.

22. A character recognition system according to claim 19, further comprising:

mode selection means for switching the operation mode between a character recognition mode in which said character recognition means performs character recognition and a normal mode in which said character recognition means does not perform character recognition; and indicator switching means for turning on and off said indicator on said display means;

wherein said indicator switching means is turned on or off according to the mode selected by said mode selection means.

23. A character recognition system according to claim 19, further comprising:

indicator size changing means for changing the size of said indicator.

24. A character recognition system according to claim 23, further comprising:

character type selection means for selecting the type of characters to be recognized by said character recognition means;

wherein said indicator size changing means changes the size of said indicator according to the type of characters selected by said character type selection means.

25. An image pick-up method comprising the steps of:

sensing an image of a subject;

displaying the sensed image of the subject;

recognizing, as a character or characters, character information included in the sensed image;

selecting an operation mode between a first mode in which said recognition step is performed and a second mode in which said recognition step is not performed; and turning on and off an indicator on a display means, according to the selected operation mode, a size of said displayed indicator indicating a minimum character size for character recognition processing performed in said recognizing step.

26. A method comprising the steps of:

inputting character information;

displaying character information input by said input step;

recognizing, as a character or characters, the character information input by said input step;

selecting an operation mode between a first mode in which said character recognition is performed and a second mode in which said character recognition is not performed; and performing control such that an indicator is displayed on a display means in such a manner that a size of the displayed indicator indicates a minimum character size for character recognition processing performed by said recognizing step in a state that the first mode is selected in said selection step.

27. A character recognition method comprising the steps of:

displaying input character information;

recognizing said character information as a character or characters;

selecting an operation mode between a first mode in which said character recognition is performed and a second mode in which said character recognition is not performed; and performing control such that an indicator is displayed on a display means in such a manner that a size of the displayed indicator indicates a minimum character size for character recognition processing performed by said recognizing step in a state that the first mode is selected in said selection step.

* * * * *

UNITED STATES PATENT AND TRADEMARK OFFICE
CERTIFICATE OF CORRECTION

PATENT NO. : 5,887,086

DATED : March 23, 1999

INVENTOR : Kaneyoshi Tokano

It is certified that error appears in the above-identified patent and that said Letters Patent is hereby corrected as shown below:

COVER PAGE

Under [56] References Cited, U.S. Patent Documents,
"5,513,278   4/1996   Hashiizume et al." should read
--5,513,278   4/1996   Hashizume et al.--.

COLUMN 4

Line 51, "a block diagram" should read  --block diagrams--.

COLUMN 7

Line 39, "subjected" should read --subject--.

Signed and Sealed this

Twelfth Day of October, 1999

*Attest:*

Q. TODD DICKINSON

*Attesting Officer*   *Acting Commissioner of Patents and Trademarks*